W. D. HOWELL.
Improvement in Wheels for Vehicles.
No. 133,153.                        Patented Nov. 19, 1872.
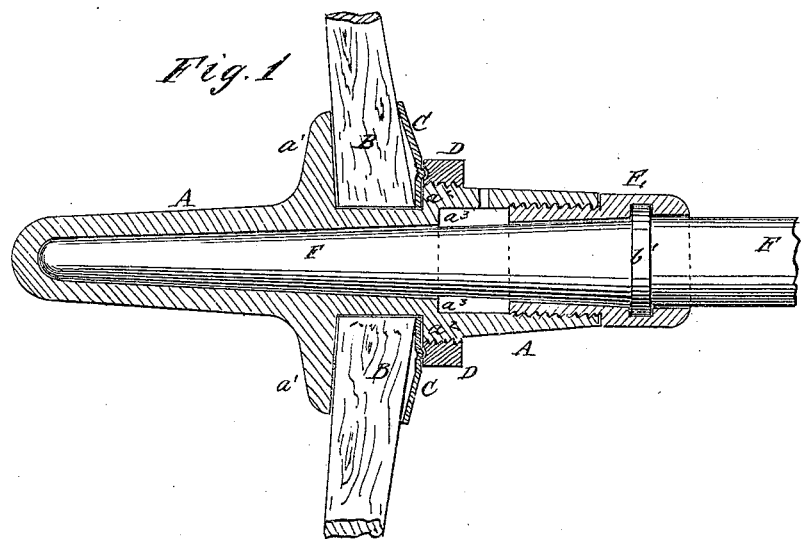
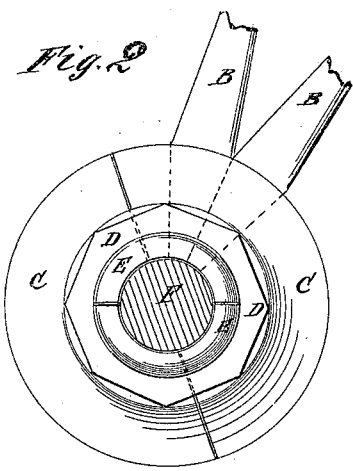
Witnesses:
A. W. Almqvist
C. Sedgwick
Inventor:
W. D. Howell
per
Attorneys.

UNITED STATES PATENT OFFICE.

WALTER D. HOWELL, OF NEWBURG, (MIDDLE HOPE P. O.,) NEW YORK.

IMPROVEMENT IN WHEELS FOR VEHICLES.

Specification forming part of Letters Patent No. 133,153, dated November 19, 1872.

*To all whom it may concern:*

Be it known that I, WALTER D. HOWELL, of Newburg, (Middle Hope P. O.,) in the county of Orange and State of New York, have invented a new and useful Improvement in Wheel and Axle, of which the following is a specification:

Figure 1 is a detail sectional view of a hub illustrating my invention. Fig. 2 is a detail view of the inner end of the same.

Similar letters of reference indicate corresponding parts.

My invention has for its object to improve the construction of iron hubs for carriage and other wheels so that they may hold the inner ends of the spokes securely, and at the same time detachably, and which will enable the hub to be secured to the axle-arm at the inner end of said hub; and it consists in the construction of the main body of the hub; in the beaded half-ring plates and grooved nut in combination with the hub; in the construction of the inner ends of the spokes; and in the combination of the grooved and halved tubular nut with the collar of the axle and with the hub, as hereinafter more fully described.

A represents the main body of the hub, which is cast with a closed outer end and with a solid ring flange, $a^1$, for the outer edges of the inner ends of the spokes B to rest against. At the inner side of the flange $a^1$ is formed a ring-groove to receive the inner ends of the spokes B, the shoulder at the inner side of said groove being made low, as shown in Fig. 1. The inner ends of the spokes B are made wedge-shaped so that their sides may fit against each other, as shown in Fig. 2. C is a ring-plate, the inner edge of which enters the spoke-groove, and which is made in two parts to enable it to be applied and removed as desired. The inner ends of the spokes B are made widest at their extreme ends, as shown in Fig. 1, and the plate C is made somewhat dishing so as to press against the edges of the said spokes. Upon the outer side of the plate C is formed a circular bead, which fits into a circular groove in the side of the nut D, so as when the nut is screwed up to hold the segmental plate C securely in place. Putty, with iron filings mixed into it, may be placed between the plate C and the edges of the spokes B to give the said plate a firmer hold upon the said spokes. Upon the inner surface of the hub A, at or near the shoulder $a^2$, is formed an offset or shoulder, $a^3$, and in the inner surface of the inner end of the hub A is cut a screw-thread into which screws a tubular nut, E. The nut E is made in two parts or halves, and has a ring-groove formed in the inner surface of its projecting part to fit upon a collar, $b'$, formed upon the axle F, so that when the hub A and nut E are screwed together it will be impossible for the wheel to work itself loose or off. By this construction a chamber is left between the end of the halved nut E and the shoulder $a^3$, which is designed to be filled with sponge, and thus to serve as an oil-reservoir, into which oil may be poured, as required, through a hole in the hub A. By this construction the most of the wear will come upon the nut E, which, when worn, may be readily replaced with a new one.

Having thus described my invention, I claim as new and desire to secure by Letters Patent—

1. The nut D, in combination with the plates C, made of concave-convex form in cross-section, as and for the purpose specified.

2. The combination of the halved and grooved tubular nut E with the collar $b'$ of the axle F, and with the hub A $a^3$, substantially as herein shown and described, for the double purpose of securing the said hub to the said axle and of forming an oil-reservoir, as set forth.

WALTER D. HOWELL.

Witnesses:
FRANK A. DAWES,
DAVID D. HOWELL.